(12) United States Patent
Sato

(10) Patent No.: US 11,433,889 B2
(45) Date of Patent: Sep. 6, 2022

(54) DRIVING CONTROL APPARATUS FOR VEHICLE

(71) Applicant: SUZUKI MOTOR CORPORATION, Hamamatsu (JP)

(72) Inventor: Katsuhiko Sato, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 28 days.

(21) Appl. No.: 16/809,291

(22) Filed: Mar. 4, 2020

(65) Prior Publication Data
US 2020/0282990 A1    Sep. 10, 2020

(30) Foreign Application Priority Data

Mar. 8, 2019 (JP) .............................. JP2019-042843

(51) Int. Cl.
*B60W 30/165*    (2020.01)
*B60W 30/12*     (2020.01)
*B60W 60/00*     (2020.01)

(52) U.S. Cl.
CPC .......... *B60W 30/165* (2013.01); *B60W 30/12* (2013.01); *B60W 60/0054* (2020.02); *B60W 60/00182* (2020.02)

(58) Field of Classification Search
CPC ....................................................... G08G 1/22
See application file for complete search history.

(56) References Cited

U.S. PATENT DOCUMENTS 8,577,553 B2    11/2013 Nitta et al.
9,308,914 B1 *  4/2016 Sun ........................ B60W 30/16
(Continued)

FOREIGN PATENT DOCUMENTS

DE    102016009709    2/2017
JP    2009-149255     7/2009
(Continued)

OTHER PUBLICATIONS

Office Action dated Oct. 28, 2021 issued in India Patent Application No. 202014006875.
(Continued)

*Primary Examiner* — Khoi H Tran
*Assistant Examiner* — Tristan J Greiner
(74) *Attorney, Agent, or Firm* — Cozen O'Connor

(57) ABSTRACT

A driving control apparatus for a vehicle having a CACC function for performing convoy cruise by cooperative adaptive cruise control using an ACC function together with driving information on convoy vehicles obtained by vehicle-to-vehicle communication, and a tracking control function for performing steering control to perform following cruise to the preceding vehicle when it is determined that a lane cannot be recognized during the convoy cruise, the driving control apparatus has a function for: notifying a driver of CACC function cancelation and of tracking control start, in case in which failure has occurred in the vehicle-to-vehicle communication or the lane cannot be recognized during the convoy cruise; shifting to following cruise by the tracking control function; and setting override threshold values serving as a determination criterion of operation intervention for (Continued)

stopping the tracking control function to a second value greater than a first value of during normal operation.

3 Claims, 5 Drawing Sheets

(56) References Cited

U.S. PATENT DOCUMENTS

| | | | |
|---|---|---|---|
| 9,637,107 | B2 | 5/2017 | Matsuno et al. |
| 9,665,779 | B2 | 5/2017 | Ooi |
| 9,809,164 | B2 | 11/2017 | Matsuno et al. |
| 9,928,746 | B1 | 3/2018 | MacNeille et al. |
| 2016/0207537 | A1* | 7/2016 | Urano .................... B62D 1/286 |
| 2017/0018189 | A1 | 1/2017 | Ishikawa |
| 2017/0225686 | A1* | 8/2017 | Takaso ................ G05D 1/0219 |
| 2018/0093668 | A1 | 4/2018 | Kim et al. |
| 2018/0173228 | A1* | 6/2018 | Wada ................. B60W 50/082 |
| 2019/0071099 | A1 | 3/2019 | Nishiguchi |
| 2019/0227546 | A1 | 7/2019 | Sato |
| 2019/0243371 | A1* | 8/2019 | Nister ................. G05D 1/0891 |
| 2019/0300014 | A1* | 10/2019 | Nagase ................. B60K 35/00 |
| 2020/0201356 | A1* | 6/2020 | Schuh .................... B60T 8/171 |
| 2020/0255007 | A1* | 8/2020 | Tsuji .................... B60W 50/16 |
| 2021/0061275 | A1* | 3/2021 | Takahama ............ B60W 30/10 |

FOREIGN PATENT DOCUMENTS

| | | |
|---|---|---|
| JP | 2012-096569 | 5/2012 |
| JP | 2013-232079 | 11/2013 |
| JP | 2015-022423 | 2/2015 |
| JP | 2016-004443 | 1/2016 |
| JP | 2016-088383 | 5/2016 |
| JP | 2016-097827 | 5/2016 |
| JP | 2018-030479 | 3/2018 |
| JP | 2018-151287 | 9/2018 |
| JP | 2018-158684 | 10/2018 |
| JP | 2019-051894 | 4/2019 |
| JP | 2019-519039 | 7/2019 |
| JP | 2019-127136 | 8/2019 |
| WO | WO 2009/086857 | 7/2009 |
| WO | WO 2017/210200 | 12/2017 |

OTHER PUBLICATIONS

Office Action dated Oct. 7, 2021 issued in related U.S. Appl. No. 16/597,540.

Notice of Allowance dated Apr. 4, 2022 issued in U.S. Appl. No. 17/030,339.

* cited by examiner

FIG.5A
FIG.5B
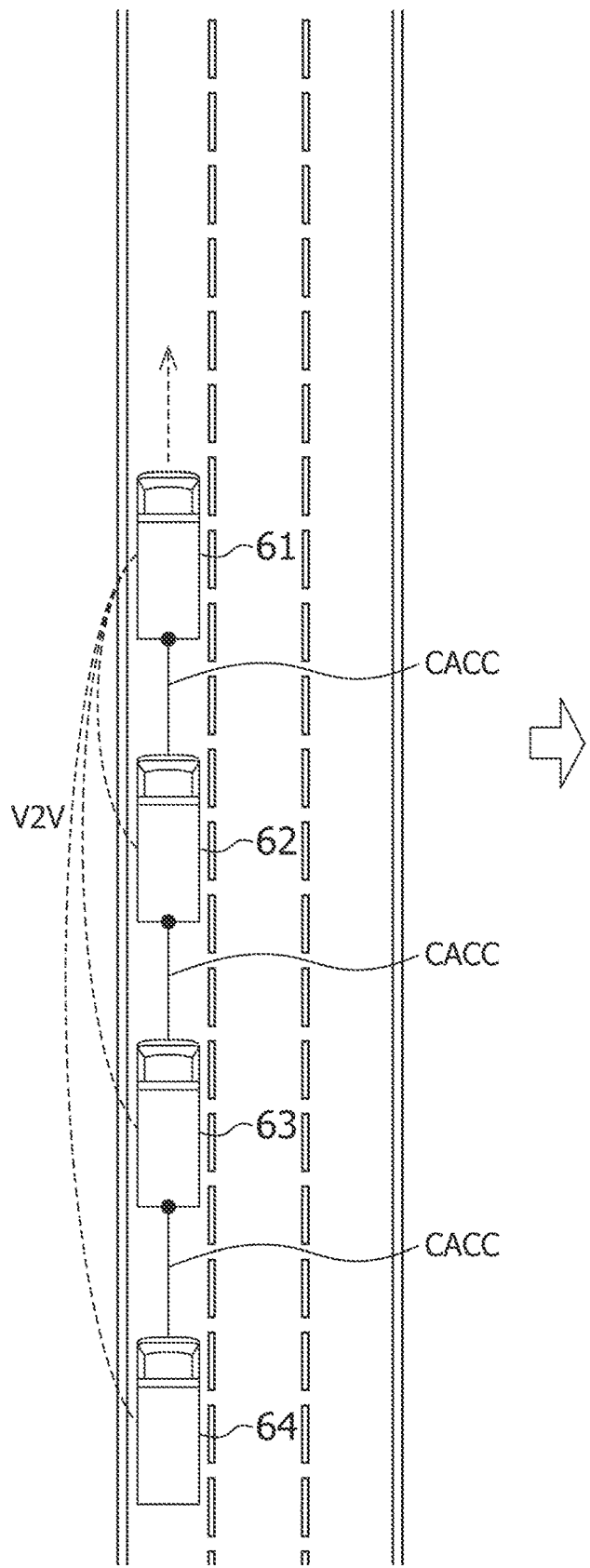
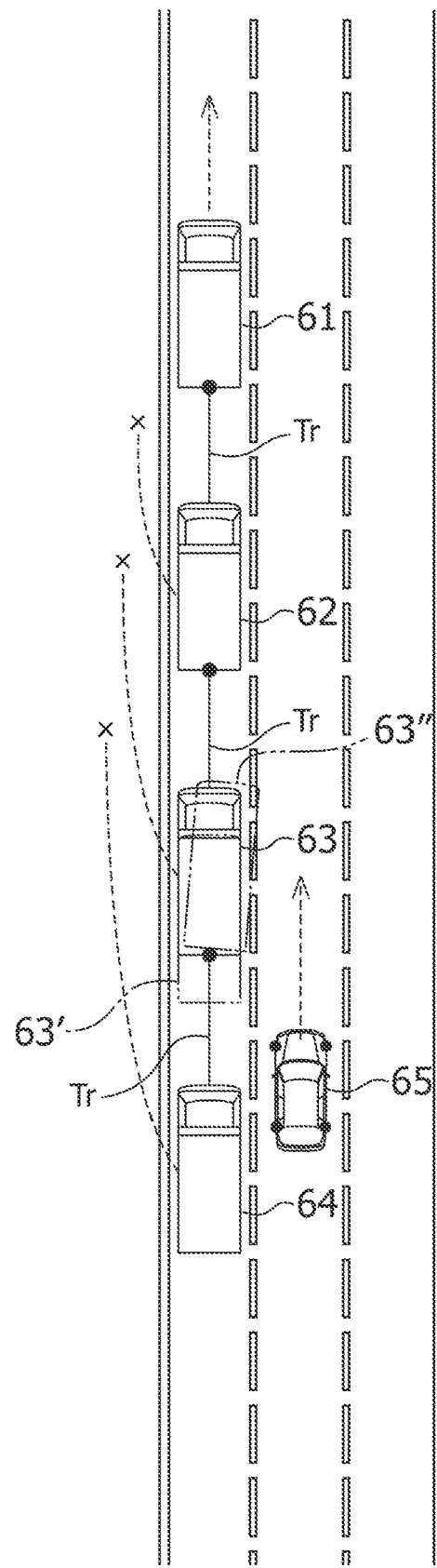

DRIVING CONTROL APPARATUS FOR VEHICLE

FIELD OF THE INVENTION

The present invention relates to a driving control apparatus for a vehicle, and more particularly, relates to a convoy cruise system using vehicle-to-vehicle communication.

DISCUSSION OF THE RELATED ART

A variety of techniques for reducing burdens on drivers and for safe-driving support, for example, adaptive cruise control systems (ACCS) and lane keeping assistance systems (LKAS), have been put into practical use. Furthermore, the practical application and international standardization of "cooperative adaptive cruise control (CACC)" for performing convoy cruise by sharing acceleration/deceleration information on a plurality of vehicles by vehicle-to-vehicle communication on the basis of these techniques are being promoted.

The convoy cruise by the cooperative adaptive cruise control includes, in addition to a following unmanned convoy cruise corresponding to "electronic traction" that causes unmanned following vehicles to follow a manned leading vehicle, a following manned convoy cruise that causes manned following vehicles to follow a manned leading vehicle. In the following manned convoy cruise, drivers in following vehicles are also required to perform manual driving at a time of diversion, merging, or the like at an interchange, a service area, or a parking area (for example, see Patent Literature 1).

In JP 2015-022423, such a following manned convoy cruise, if any failure, for example, communication failure occurs during the convoy cruise by CACC, cancellation of CACC driving is notified, and the vehicles are supposed to shift from CACC driving using vehicle-to-vehicle communication to front vehicle following cruise (preceding vehicle tracking control) on the basis of sensor information on the respective vehicles.

Because, during convoy cruise, the vehicles are travelling in a relatively short inter-vehicle time by cooperative adaptive cruise control sharing acceleration/deceleration information on the vehicles, if a vehicle is overridden and shifts to manual driving by brake operation or manual steering of a driver who is overwhelmed by the notification of occurrence of communication failure and CACC cruise cancellation, the vehicle may approach a following vehicle or may approach a vehicle in a neighboring lane by lane departure.

SUMMARY OF THE INVENTION

The present invention has been made in view of the above-described actual situation, and an object is to prevent lane departure and approach to a following vehicle due to unnecessary operation intervention during convoy cruise.

In order to solve the above-described problems, one aspect of the present invention is directed to a driving control apparatus for a vehicle, including: an environmental condition estimating part including a surrounding recognition function including a function for recognizing a lane and a preceding vehicle and a function for obtaining a vehicle's moving state; a path generating part for generating a target path on the basis of information obtained by the environmental condition estimating part; a vehicle control part for performing speed control and steering control for causing the vehicle to follow the target path; and a vehicle-to-vehicle communication part for exchanging driving information among convoy vehicles. The vehicle-to-vehicle communication part has an ACC function for performing constant speed cruise at a target speed or performing following cruise to the preceding vehicle at a target inter-vehicle time; an LKA function for maintaining cruise in the vehicle's lane by following control to the target path; a CACC function for performing convoy cruise by cooperative adaptive cruise control using the ACC function together with the driving information on the convoy vehicles obtained by the vehicle-to-vehicle communication part; and a tracking control function for performing steering control to perform following cruise to the preceding vehicle on the basis of the information obtained by the environmental condition estimating part when it is determined that the lane cannot be recognized during the convoy cruise. The driving control apparatus has a function for: notifying a driver of CACC function cancellation and of tracking control start, in case in which it is determined that failure has occurred in the vehicle-to-vehicle communication or the lane cannot be recognized during the convoy cruise; shifting to following cruise by the tracking control function; and altering override threshold values serving as a determination criterion of operation intervention for stopping the tracking control function to a value greater than during normal operation.

According to the driving control apparatus for the vehicle according to the present invention, because the override threshold values serving as a determination criterion of operation intervention are altered to a value greater than during normal operation when it is determined that failure has occurred in vehicle-to-vehicle communication or a lane cannot be recognized during convoy cruise, if a driver who is overwhelmed by the notification of CACC function cancellation and tracking control start performs excessive operation intervention, override can be avoided, which enables shift to tracking control, and can prevent lane departure and approach to a following vehicle due to excessive operation intervention.

BRIEF DESCRIPTION OF DRAWINGS

FIG. 5A is a schematic plan view exemplifying convoy cruise by cooperative adaptive cruise control.

FIG. 5B is a schematic plan view exemplifying override due to excessive operation intervention at the time of occurrence of failure in vehicle-to-vehicle communication during convoy cruise and prevention control thereof.

DETAILED DESCRIPTION OF THE DRAWINGS

Hereinafter, an embodiment of the present invention will be described in detail with reference to the drawings.

Figure 1:
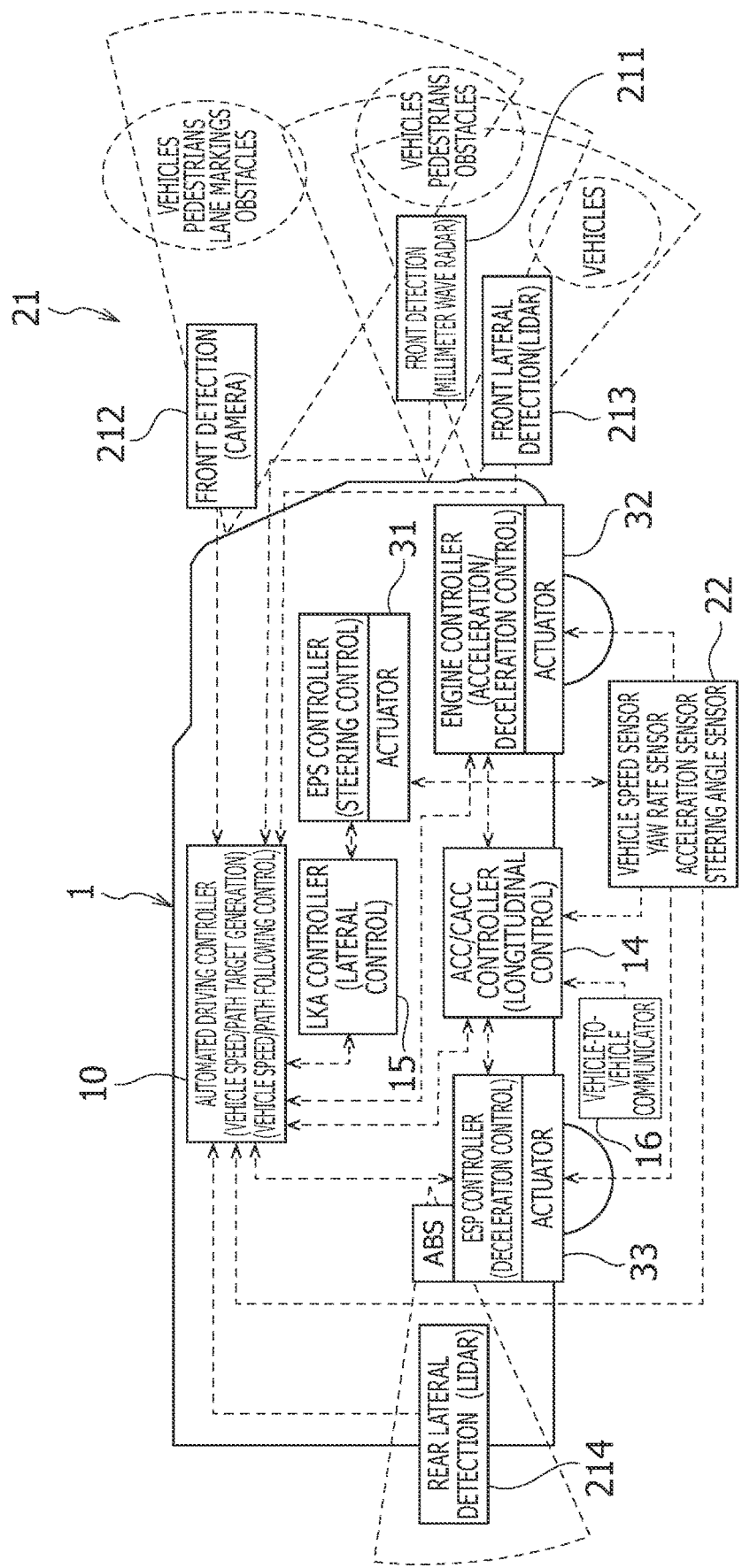
FIG. 1 is a schematic view showing a driving control system of a vehicle.

In FIG. 1, a vehicle is illustrated equipped with a driving control system according to the present invention. In addition to common components, such as an engine and a vehicle body of an automobile, the automobile has an external sensor 21 for detecting a vehicle surrounding environment, an internal sensor 22 for detecting vehicle information, a controller/actuator group for speed control and steering control, an ACC/CACC controller 14 for adaptive cruise control, an LKA controller 15 for lane keeping support control, a vehicle-to-vehicle communicator 16, and an automated driving controller 10 for controlling them and performing cooperative adaptive cruise control (CACC) to execute convoy cruise by a plurality of vehicles, in order to perform, at the vehicle side, recognition, determination, and operation conventionally performed by a driver.

The controller/actuator group for speed control and steering control includes an EPS (Electric Power Steering) controller 31 for steering control, an engine controller 32 for acceleration/deceleration control, and an ESP/ABS controller 33. An ESP (registered trademark; Electronic Stability Program) includes an ABS (Antilock Brake System) to form a stability control system (vehicle behavior stabilization control system).

The external sensor 21 is composed of a plurality of detection means for inputting lane markings on a road defining the vehicle's own driving lane and the neighboring lane, and presence of and relative distance from other vehicles, obstacles, people, and the like around the vehicle into the automated driving controller 10 as image data or point cloud data.

Figure 2:
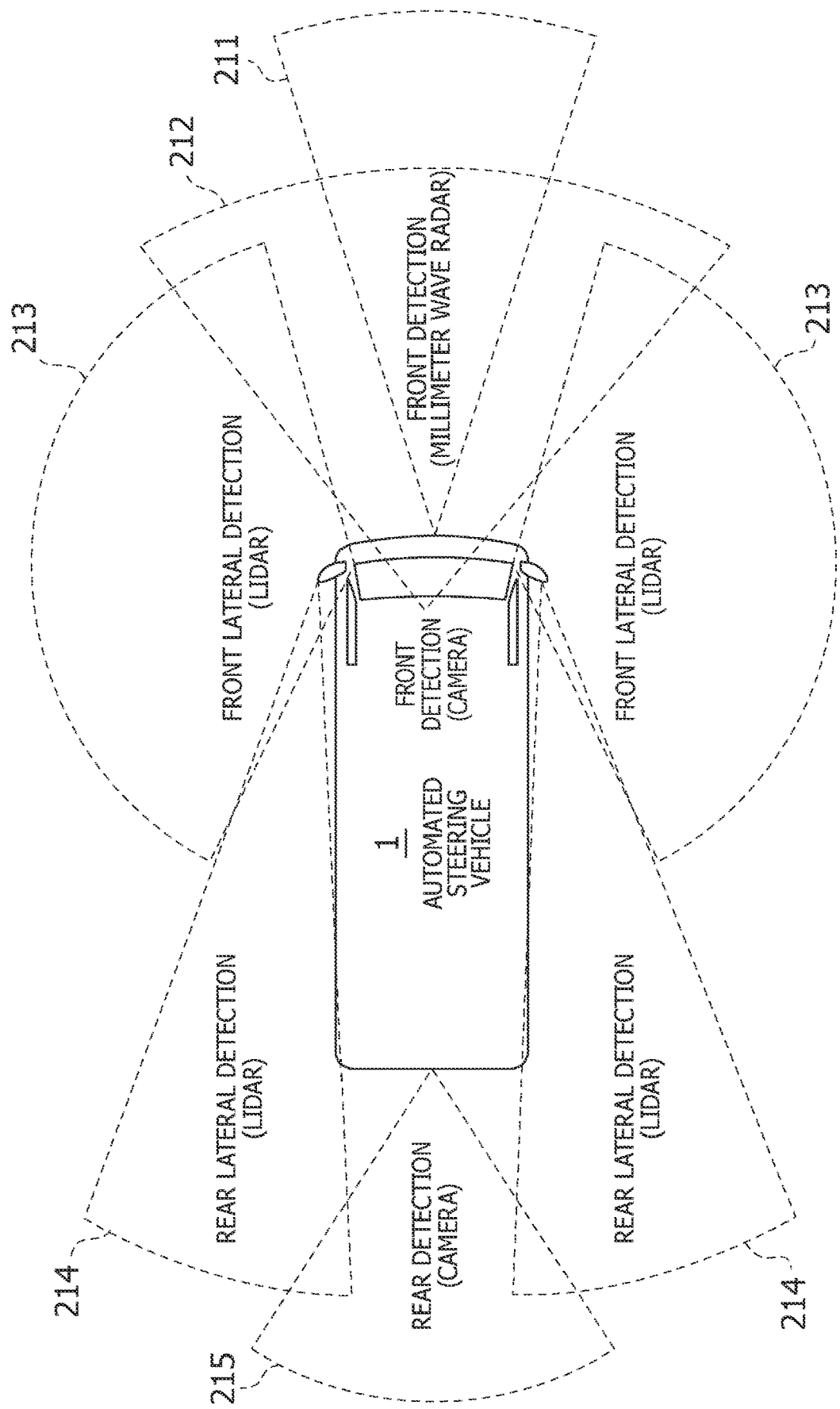
FIG. 2 is a schematic plan view showing an external sensor group of the vehicle.

For example, as shown in FIG. 2, the vehicle 1 includes a millimeter wave radar (211) and a camera (212) as forward detection means 211 and 212, LIDAR (Laser Imaging Detection And Ranging) as front lateral direction detection means 213, a LIDAR or rearview mirror camera as rear lateral direction detection means 214, and a camera (back camera) as rearward detection means 215, covers 360 degrees around the vehicle, and can detect positions of and distances from vehicles, obstacles and the like, and positions of lane markings within a predetermined distance in the front, rear, left, and right directions of the vehicle itself.

Figure 3:
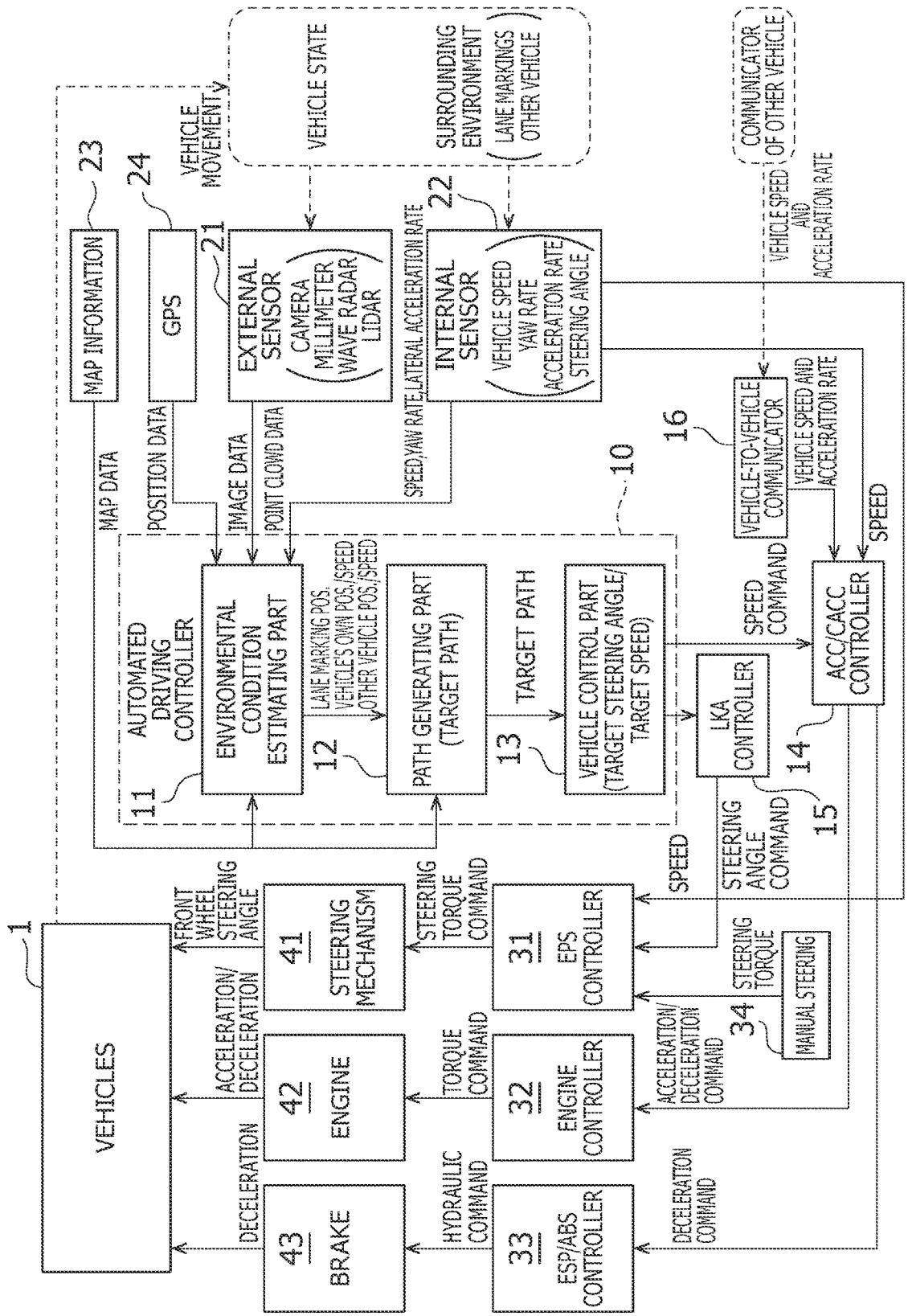
FIG. 3 is a block diagram showing the driving control system of the vehicle.

The internal sensor 22 is composed of a plurality of detection means, such as a vehicle speed sensor, a yaw rate sensor and an acceleration sensor, for measuring physical quantities representing the movement state of the vehicle, and their measurement values are input into the automated driving controller 10, ACC/CACC controller 14, LKA controller 15, and EPS controller 31 as shown in FIG. 3.

The automated driving controller 10 includes an environmental condition estimating part 11, a path generating part 12 and a vehicle control part 13, and includes a computer for performing functions as described below, that is, a ROM storing programs and data, a CPU for performing arithmetic processing, a RAM for reading out the programs and data, and storing dynamic data and arithmetic processing results, an input/output interface, and the like.

The environmental condition estimating part 11 acquires the absolute position of the vehicle itself and a road shape (road curvature and cant) by matching the vehicle's own positional information by positioning means 24 such as a GPS and map information 23, and on the basis of external data such as the image data and point cloud data obtained by the external sensor 21, estimates positions of lane markings of the vehicle's own driving lane and the neighboring lane, and positions and speeds of other vehicles. In addition, it acquires the movement state of the vehicle itself from internal data measured by the internal sensor 22.

The path generating part 12 generates a target path for keeping the lane on the basis of the position of lane marking (outer line) of the vehicle's own driving lane detected by the external sensor 21. It can also generate a target path for keeping the lane on the basis of the vehicle's own position and the road shape (road curvature and cant) estimated by the environmental condition estimating part 11 in addition to the position of lane marking (outer line) of the vehicle's own driving lane detected by the external sensor 21.

The vehicle control part 13 calculates a target speed and a target steering angle on the basis of the target path generated by the path generating part 12, transmits a speed command for constant speed cruise or inter-vehicle distance keeping and following cruise to the ACC/CACC controller 14, and transmits a steering angle command for path following to the EPS controller 31 via the LKA controller 15.

The vehicle speed is also input into the EPS controller 31 and ACC/CACC controller 14. Because a steering torque changes according to the vehicle speed, the EPS controller 31 refers to a steering angle-steering torque map for each vehicle speed and transmits a torque command to a steering mechanism 41. The engine controller 32, ESP/ABS controller 33, and EPS controller 31 control an engine 42, a brake 43, and the steering mechanism 41, and thereby control movement of the vehicle 1 in a longitudinal direction and a lateral direction.

Outline of CACC System

Next, an outline of the CACC system will be explained on the assumption of performing convoy cruise within the same vehicle lane while following a vehicle ahead on a highway.

The convoy cruise by CACC can be executed in a state in which both adaptive cruise control by the ACC/CACC controller 14 and lane keeping control by the LKA controller 15 operate and the vehicle-to-vehicle communicator 16 can transmit and receive speed and acceleration information on another vehicle (leading vehicle).

The automated driving controller 10 (path generating part 12) generates a target path within a single lane and a target speed for partially automated in-lane driving on the basis of the external information (lanes, the vehicle's own position, and positions and speeds of other vehicles driving in the vehicle's own driving lane and the neighboring lane) obtained by the environmental condition estimating part 11 through the external sensor 21, the internal information (vehicle speed, yaw rate, and acceleration) obtained by the internal sensor 22, and the road shape information.

In addition, the automated driving controller 10 (vehicle control part 13) estimates the speed, attitude, and lateral displacement of the vehicle after $\Delta t$ seconds from a relationship between a yaw rate y and lateral acceleration ($d^2y/dt^2$) occurring due to vehicle movement by the vehicle position and movement characteristics, that is, a front wheel steering angle $\delta$ occurring when a steering torque T is applied to the steering mechanism 41 during traveling at a vehicle speed V, gives a steering angle command that makes the lateral displacement to "yt" after $\Delta t$ seconds to the EPS controller 31 via the LKA controller 15, and gives a speed command that makes the speed to "Vt" after $\Delta t$ seconds to the ACC/CACC controller 14.

Although the ACC/CACC controller 14, LKA controller 15, EPS controller 31, engine controller 32, and ESP/ABS controller 33 operate independently of automatic steering, they are also operable according to command input from the automated driving controller 10.

The ESP/ABS controller 33 that has received a deceleration command from the ACC/CACC controller 14 issues a hydraulic command to an actuator and controls braking force of the brake 43 to control the vehicle speed. In addition, an engine controller 32 that has received an acceleration/deceleration command from the ACC/CACC controller 14 controls an actuator output (degree of throttle opening) to give the engine 42 a torque command and controls driving force to control the vehicle speed.

ACC driving and CACC driving function by a combination of hardware and software, such as the millimeter wave radar as the forward detection means 211 included in the external sensor 21, ACC/CACC controller 14, engine controller 32, and ESP/ABS controller 33.

That is, in ACC driving, in a case in which there is no vehicle ahead, constant speed cruise is performed by setting a cruise control set speed as the target speed; and in a case of having caught up with the vehicle ahead (in a case in which a speed of the vehicle ahead is equal to or slower than the cruise control set speed), following cruise to the vehicle ahead is performed while maintaining an inter-vehicle distance corresponding to a time gap (inter-vehicle time=inter-vehicle distance/speed of the vehicle itself) set in accordance with the speed of the vehicle ahead.

On the other hand, during CACC driving, the speed and acceleration information on a preceding vehicle (leading vehicle) is transmitted to the ACC/CACC controller 14 by vehicle-to-vehicle communication (V2V), the target speed is generated based on that, an acceleration/deceleration command is given to the engine controller and a deceleration command is given to the ESP/ABS controller, and thereby following cruise to the vehicle ahead is performed while maintaining an inter-vehicle distance (close inter-vehicle distance) shorter than the above-described time gap.

The LKA function (LKAS) recognizes the lane markings (outer line and border) of the vehicle's own driving lane by the environmental condition estimating part 11 of the automated driving controller 10 on the basis of image data obtained by the external sensor 21 (cameras 212 and 215), and performs lateral control by the LKA controller 15 so as to follow the target path generated on the basis of the vehicle's own position and the road shape (road curvature and cant).

That is, the EPS controller 31 that has received the steering angle command from the LKA controller 15 refers to a vehicle speed-steering angle-steering torque map, issues a torque command to an actuator (EPS motor), gives a front wheel steering angle targeted by the steering mechanism 41, and performs cruise within the same vehicle lane.

The CACC system enables convoy cruise with close inter-vehicle distance by performing cooperative adaptive cruise control sharing speed and acceleration information on other vehicles (leading vehicle) performing convoy cruise by vehicle-to-vehicle communication (V2V) on the basis of longitudinal control (speed control and adaptive cruise control) by the ACC/CACC controller 14 and lateral control (steering control and lane keeping driving control) by the LKA controller 15 as described above.

For example, a time gap set in normal ACC is about 1 sec at the shortest (inter-vehicle distance at a vehicle speed of 80 km/h: 22 m) whereas there is a case in which a time gap at the time of convoy cruise by CACC is 0.2 sec (inter-vehicle distance at the vehicle speed of 80 km/h: 4 m), and it can be said that it is possible to drive with a considerably short inter-vehicle distance. Such convoy cruise with such a close inter-vehicle distance has an advantage of being able to prevent cutting-in by other vehicles in addition to reducing the air resistance of following vehicles.

Preceding Vehicle Tracking Control

The vehicle-to-vehicle communicator 16 is made redundant in case of system failure and, for example, a duplicating countermeasure of 5.8 GHz radio/optical communication is taken. Furthermore, even if vehicle-to-vehicle communication is disrupted during CACC driving, preceding vehicle tracking control enables a vehicle to perform following cruise to a preceding vehicle and continue convoy cruise.

The preceding vehicle tracking control is to detect a travelling position deviation (lateral deviation and inclination angle) with a preceding vehicle by the external sensor 21 in order to continue convoy cruise when a road shoulder line (outer line) cannot be recognized due to snowfall or the like or in a section where there is no road shoulder line and to perform following cruise to the preceding vehicle by controlling the steering angle by algorithm similar to lane keeping control.

Override Function

The CACC system has an override function for switching to manual driving by the driver's operation intervention during CACC driving or convoy cruise by preceding vehicle tracking control. That is, when a deceleration request by the driver's brake pedal operation is equal to or greater than a threshold value or when a steering torque by the driver's manual steering 34 is equal to or greater than override threshold values, CACC or preceding vehicle tracking control is stopped, shifting to the driver's manual driving.

The override threshold values are set to an amount of brake operation (ESP hydraulic command value, brake operation speed, or brake depression acceleration or force on pedal) based on which it is determined that the driver has performed deceleration operation with an intention according to acceleration/deceleration characteristics and a driving state of the vehicle, or an amount of operation (steering torque and steering angular velocity) based on which it is determined that the driver has performed steering with an intention of additive steering or subtractive steering according to steering characteristics and the driving state of the vehicle.

Excessive Operation Prevention Function at Occurrence of Failure

When some kind of failure, for example, communication failure occurs during convoy cruise by CACC, drivers of the vehicles are notified of the occurrence of system failure and CACC driving cancellation, and preceding vehicle tracking control start by an HMI, shifting from CACC driving using vehicle-to-vehicle communication to preceding vehicle tracking control.

Because, during convoy cruise, the vehicles are travelling at close inter-vehicle distance by cooperative adaptive cruise control, and the vehicles are still travelling at short inter-vehicle distance immediately after preceding vehicle tracking control start, if a vehicle is overridden by brake operation or manual steering of a driver who is overwhelmed by the notification of the occurrence of communication failure and CACC driving cancellation and shifts to manual driving, the vehicle may approach a following vehicle or approach a vehicle in a neighboring lane due to lane departure.

The automated driving controller 10 according to the present invention has an excessive operation prevention function that, when shifting to preceding vehicle tracking control due to the occurrence of failure during convoy cruise by CACC, changes a brake override threshold value and a steering override threshold value to a value greater than during normal operation at the same time as the notification of CACC driving cancellation and preceding vehicle tracking control start.

By increasing the brake override threshold value and steering override threshold value at the time of occurrence of failure, override is avoided and preceding vehicle tracking control is continued, and thereby approach to a following vehicle and lane departure can be prevented even if the driver who is overwhelmed by the notification of CACC driving cancellation performs excessive brake operation intervention or steering intervention and applies a large operation amount that would lead to approach to the following vehicle or lane departure before threshold value change.

Brake Override Threshold Value During Normal Operation

If an ESP hydraulic command causing deceleration with respect to the CACC set speed (cruise set speed or preceding vehicle following speed) or CACC set acceleration is given by the driver's brake depression, brake override is reached and the driver's brake operation is given priority. An ESP hydraulic command value that causes deceleration corresponding to, for example, a speed of 2 km/h with respect to the CACC set speed or an ESP hydraulic command value that causes deceleration corresponding to 0.2 m/s² with respect to the CACC set acceleration is set as a threshold value Pd.

Brake Override Threshold Value at Occurrence of Failure

A value greater than the brake override threshold value during normal operation, preferably in the range of 120% to 250%, and more preferably in the range of 150% to 220% of the brake override threshold value during normal operation is selected. For example, an ESP hydraulic command value that gives deceleration corresponding to a speed of 4 km/h with respect to the CACC set speed or an ESP hydraulic command value that causes deceleration corresponding to 0.4 m/s² with respect to the CACC set acceleration is set as a threshold value Pc.

Steering Override Threshold Value During Normal Operation

A value (steering torque target value calculated from the vehicle speed-steering angle-steering torque map) obtained by converting a steering angle calculated from a target lateral displacement "y't" and movement characteristics of the vehicle into a steering torque on the basis of vehicle speed and a lateral acceleration limit value (example, 1 m/s²) and target lateral movement distance μ, for example, a steering torque corresponding to a steering angle by which a target lateral displacement becomes "y't" (y't=yt+α, for example, α=yt/2) after "t" seconds is set as an additive steering override threshold value T1d.

In the case of subtractive steering, a value that can be determined to not be minute (determined by the steering angle, steering angular velocity, or the like) and is applied in a direction of reducing the steering torque to a value (steering torque target value) obtained by converting a steering angle calculated from a target lateral movement distance "yt" and the movement characteristics of the vehicle into a steering torque is set as a subtractive steering override threshold value T2d.

Steering Override Threshold Value at Occurrence of Failure

For an additive steering override threshold value, a value (set in consideration of vehicle speed-steering angle-steering torque map and vehicle movement characteristics) obtained by adding a steering torque by which lateral movement distance by the driver's additional steering becomes a predetermined value or more to an override threshold value during normal operation is set as an additive steering override threshold value T1c. For example, when a vehicle with a vehicle width of 1.7 m performs LKAS driving on a highway with a lane width of 3.5 m, if the vehicle is travelling at the left end of the lane, a target lateral displacement after r seconds is 1.75-0.85=0.9 m, but at the time of occurrence of failure, a steering torque corresponding to a steering angle by which a target lateral displacement after t seconds becomes 1.8 m (2×0.9) is set as an additive steering override threshold value T1c. In this case, if the target lateral displacement is set to 1.8 m, it is possible to maintain cruise within the lane.

In the case of subtractive steering, only when road shoulder width is wide, a tentative target lateral displacement is set in a range in which front wheels do not straddle the lane marking (outer line), and a steering torque by which a target lateral displacement after r seconds becomes, for example, 0.3 m is set as an override threshold value T2c. This is because there is a possibility that override is easily reached if it is determined by a manual steering torque with respect to a steering torque target value as during normal operation.

Figure 4:
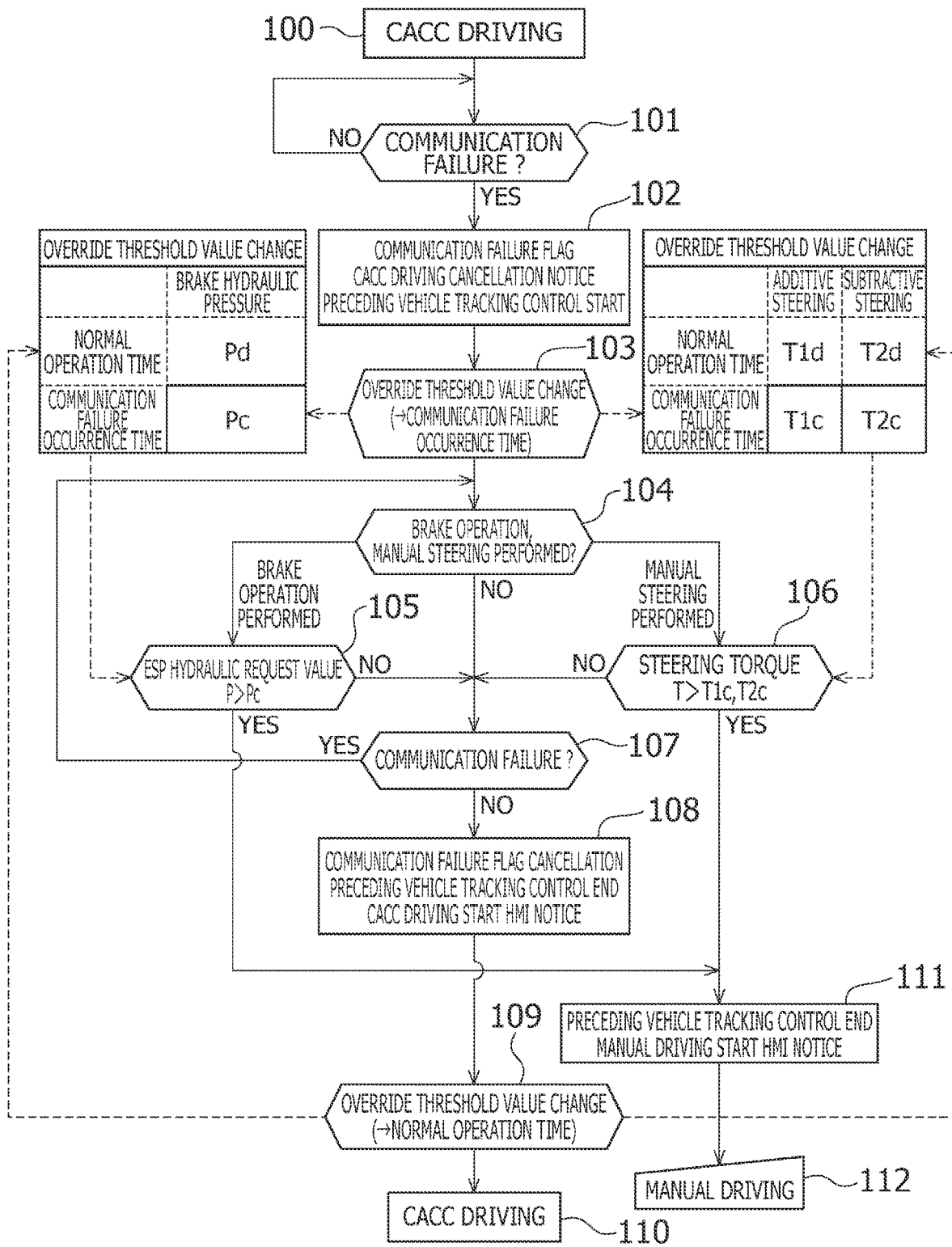
FIG. 4 is a flowchart showing prevention control of override due to excessive operation intervention at a time of occurrence of failure in vehicle-to-vehicle communication during convoy cruise.

Excessive Operation Prevention Flow at Occurrence of Failure During CACC Driving Next, an excessive operation prevention flow by override threshold value change when communication failure occurs will be described with reference to FIG. 4.

(1) CACC Driving by Vehicle-to-Vehicle Communication

Following vehicles 62, 63, and 64 in convoy cruise perform convoy cruise (CACC driving) by cooperative adaptive cruise control sharing speed and acceleration information on a leading vehicle 61 through vehicle-to-vehicle communication V2V in the state in which adaptive cruise control by the ACC/CACC controller 14 and lane keeping control by the LKA controller 15 are both operating (step 100).

(2) Communication Failure Determination

During CACC driving, it is constantly monitored whether communication failure due to failure of the communicator itself, radio wave failure, or the like occurs by an abnormality detection function of the vehicle-to-vehicle communicator 16 (step 101).

(3) Communication Failure Flag

During CACC driving, if it is determined that communication failure has occurred, a communication failure flag is set (step 102).

(4) CACC Driving Cancellation and Preceding Vehicle Tracking Control Start Notice At the same time, the driver is notified of the occurrence of communication failure, CACC driving cancellation, and preceding vehicle tracking control start by the HMI, for example, display in a head-up display or meter panel or voice.

(5) Override Threshold Value Change

At the same time, the brake override threshold value Pd and steering override threshold values (additive direction T1d and subtractive direction T2d) during normal operation are altered to a brake override threshold value Pc (Pc>Pd) at the time of occurrence of failure and steering override threshold values (additive direction T1c and subtractive direction T2c) at the time of occurrence of failure, respectively (step 103).

(6) Preceding Vehicle Tracking Control Start

Preceding vehicle tracking control starts, detecting a travelling position deviation (lateral deviation and inclination angle) with a preceding vehicle by the external sensor 21, and following the preceding vehicle by controlling the steering angle by algorithm similar to lane keeping control.

(7) Determination of Whether Brake Operation and Manual Steering are Performed

Whether brake operation is performed by the driver is determined with a position sensor attached to a brake pedal and at the same time whether manual steering 34 is performed is determined with a torque sensor attached to the EPS controller 31 (step 104).

(8) Brake Override Determination

In the case in which the brake operation by the driver is detected in step 104, the ESP hydraulic command value by the driver's brake depression is compared with the brake override threshold value Pc (step 105).

i) If the ESP hydraulic command value P>Pc, it is determined that the operation is brake override and preceding vehicle tracking control is terminated (step 111), shifting to manual driving (step 112).

ii) If the ESP hydraulic command value P Pc, the override is not carried out and preceding vehicle tracking control is continued.

(9) Steering Override Determination

On the other hand, in the case in which it is determined that manual steering is performed from a detection value of the torque sensor attached to the EPS controller 31 in step 104, the steering torque is compared with the override threshold values (additive direction T1$c$ and subtractive direction T2$c$) (step 106).

i) If the steering torque>the additive steering override threshold value T1$c$ or the steering torque>the subtractive steering override threshold value T2$c$, it is determined that the operation is override and preceding vehicle tracking control is terminated (step 111), shifting to manual driving (step 112).

ii) If the steering torque≤the additive steering override threshold value T1$c$ or the steering torque≤the subtractive steering override threshold value T2$c$, the override is not carried out, and preceding vehicle tracking control is continued.

(10) Communication Failure Recovery Determination

After determining that communication failure has occurred, it is continuously monitored whether the communication failure is recovered by the abnormality detection function of the vehicle-to-vehicle communicator 16 (step 107).

(11) Communication Failure Flag Cancellation

If the communication failure is recovered while preceding vehicle tracking control is continuing, the communication failure flag is cancelled (step 108).

(12) Preceding Vehicle Tracking Control End and CACC Driving Start Notice

At the same time, the driver is notified of preceding vehicle tracking control end and CACC driving start by the HMI (display in the head-up display or meter panel or voice).

(13) Override Threshold Value Change

At the same time, the brake override threshold value Pc and steering override threshold values (additive direction T1$c$ and subtractive direction T2$c$) are altered to the brake override threshold value Pd and steering override threshold values (additive direction T1$d$ and subtractive direction T2$d$) during normal operation, respectively (step 109).

(14) CACC Driving Resumption

Preceding vehicle tracking control is terminated and CACC driving is resumed (step 110).

Although override by excessive steering at the time of occurrence of communication failure can be basically prevented by the override threshold value change as described above, if the manual steering is equal to or greater than the override threshold value in the above-described override determination (step 106), preceding vehicle tracking control will be overridden by the manual steering.

When the override threshold value is altered at the time of occurrence of communication failure (step 103), by changing an upper limit value of the steering torque or steering angle (in inverse proportion to vehicle speed/decreases as vehicle speed increases) set according to vehicle speed by the EPS controller 31 to a value lower than during normal operation, excessive steering can also be prevented when it is overridden by the manual steering.

When the override threshold value is altered at the time of occurrence of communication failure (step 103), by changing a steering gain of the manual steering to a small value by the EPS controller 31, it is also possible to partially reflect the steering amount on the steering torque when it is overridden by the manual steering.

Operation and Effects

As detailed above, because the driving control apparatus for the vehicle according to the present invention is configured so that the override threshold values serving as a determination criterion of operation intervention for stopping preceding vehicle tracking control are altered to a value greater than during normal operation when shifting to preceding vehicle tracking control due to occurrence of communication failure during CACC driving, excessive operation prevention effects in the cases exemplified below can be expected.

For example, as shown in FIG. 5A, in the case in which a leading vehicle 61 and three following vehicles 62, 63, and 64 share driving information (vehicle speed and acceleration of the leading vehicle 61) through vehicle-to-vehicle communication (V2V) and are performing convoy cruise at close inter-vehicle distance by cooperative adaptive cruise control (CACC), when communication failure occurs, as shown in FIG. 5A, CACC driving cancellation and preceding vehicle tracking control start are notified, and each following vehicle 62, 63, or 64 shifts to preceding vehicle tracking control Tr to perform following cruise to a preceding vehicle (61, 62, 63) by their sensor information.

At this time, immediately after shift to the preceding vehicle tracking control Tr, because each following vehicle 62, 63, or 64 is still following the preceding vehicle at close inter-vehicle distance, when a driver (for example, of the following vehicle 63) who is overwhelmed by the notification of CACC driving cancellation and preceding vehicle tracking control start performs override by brake operation or steering operation, the vehicle may approach the following vehicle 64 due to deceleration (63') of the vehicle, deviate from the vehicle's own driving lane due to lateral movement (63") of the vehicle, or approach a following vehicle 65 in a neighboring lane.

However, because the driving control apparatus for the vehicle according to the present invention is configured so that the override threshold values serving as a determination criterion of operation intervention for stopping preceding vehicle tracking control are altered to a value greater than during normal operation when shifting to preceding vehicle tracking control due to occurrence of communication failure during CACC driving, override by the driver's operation intervention can be avoided, which enables shift to preceding vehicle tracking control without approach to following vehicles or lane departure.

Although the embodiment has described override threshold value change at the time of communication failure, in the case of shifting to preceding vehicle tracking control when the external sensor 21 cannot recognize a lane, for example, when a road shoulder line (outer line) cannot be recognized due to snowfall or the like, or in a section where there is no road shoulder line, it is also possible to avoid override due to excessive operation by changing the override threshold values at the same time as the notification of preceding vehicle tracking control start.

Although some embodiments of the present invention have been described above, the present invention is not limited to the embodiments, various modifications and changes are possible within the scope of the present invention.

What is claimed is:

1. A driving control apparatus for a vehicle, comprising:
   an environmental condition estimating part including a surrounding recognition function including a function for recognizing a lane and a preceding vehicle and a function for obtaining a vehicle's moving state;
   a path generating part for generating a target path on the basis of information obtained by the environmental condition estimating part;
   a vehicle control part for performing speed control and steering control for causing the vehicle to follow the target path; and
   a vehicle-to-vehicle communication part for exchanging driving information among convoy vehicles, and having:
      an adaptive cruise control (ACC) function for performing constant speed cruise at a target speed or performing following cruise to the preceding vehicle at a target inter-vehicle time;
      a lane keeping assist (LKA) function for maintaining cruise in the vehicle's lane by steering control to follow the target path;
      a cooperative adaptive cruise control (CACC) function for performing convoy cruise by cooperative adaptive cruise control using the ACC function together with the driving information on a leading vehicle of the convoy vehicles obtained by the vehicle-to-vehicle communication part and the steering control; and
      a tracking control function for performing steering control to perform following cruise to the preceding vehicle on the basis of the information of the preceding vehicle obtained by the environmental condition estimating part when it is determined that the lane cannot be recognized during the convoy cruise,
   Wherein upon making a determination that a failure has occurred in the vehicle to vehicle communication or the lane cannot be recognized during convoy cruise, canceling the CACC function, shifting to following cruise by the tracking control function, notifying the driver of a cancelation of the CACC and a start of tracking control, and setting override threshold values serving as a determination criterion of operation intervention for stopping the tracking control function to a second value greater than a first value present during normal operation.

2. The driving control apparatus for the vehicle according to claim 1, wherein the override threshold values include a brake override threshold value serving as a determination criterion of brake operation intervention and/or a steering override threshold value serving as a determination criterion of steering operation intervention.

3. The driving control apparatus for the vehicle according to claim 1, wherein the override threshold values serving as the determination criterion of the operation intervention for stopping the tracking control function are configured to be returned to the first values during normal operation when, after it is determined that failure has occurred in the vehicle-to-vehicle communication or a lane cannot be recognized during the convoy cruise, they are cleared.

* * * * *